US011102808B2

(12) United States Patent
Takeda et al.

(10) Patent No.: US 11,102,808 B2
(45) Date of Patent: Aug. 24, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Kazuaki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/098,951

(22) PCT Filed: May 2, 2017

(86) PCT No.: PCT/JP2017/017228
§ 371 (c)(1),
(2) Date: Nov. 5, 2018

(87) PCT Pub. No.: WO2017/191840
PCT Pub. Date: Nov. 9, 2017

(65) Prior Publication Data
US 2019/0124682 A1    Apr. 25, 2019

(30) Foreign Application Priority Data

May 6, 2016  (JP) .............................. JP2016-093481

(51) Int. Cl.
*H04W 72/14* (2009.01)
*H04W 74/08* (2009.01)
(Continued)

(52) U.S. Cl.
CPC ........... *H04W 72/14* (2013.01); *H04W 56/00* (2013.01); *H04W 72/0446* (2013.01);
(Continued)

(58) Field of Classification Search
CPC combination set(s) only.
See application file for complete search history.

(56) References Cited

U.S. PATENT DOCUMENTS 8,976,748 B2    3/2015  Uemura
2010/0041428 A1*  2/2010  Chen .................. H04W 52/367
                                                                        455/522
(Continued)

FOREIGN PATENT DOCUMENTS

JP          2011-205242 A        10/2011

OTHER PUBLICATIONS

International Search Report issued in PCT/JP2017/017228 dated Jun. 13, 2017 (1 page).
(Continued)

*Primary Examiner* — Lonnie V Sweet
(74) *Attorney, Agent, or Firm* — Osha Bergman Watanabe & Burton LLP

(57) ABSTRACT

The present invention is designed to provide a user terminal and a radio communication method, whereby the period to apply contention-based UL data transmission can be configured adequately. A user terminal according to the present invention has a transmission section that transmits UL data to a radio base station, and a control section that controls application of contention-based UL data transmission in which UL data is transmitted without a UL grant from the radio base station, and the control section controls whether or not to apply the contention-based UL data transmission based on a running state of a timing advance (TA) timer.

5 Claims, 14 Drawing Sheets

(51) Int. Cl.
*H04W 56/00* (2009.01)
*H04W 72/04* (2009.01)
*H04W 88/02* (2009.01)
*H04W 88/08* (2009.01)

(52) U.S. Cl.
CPC ....... *H04W 74/08* (2013.01); *H04W 74/0833* (2013.01); *H04W 88/02* (2013.01); *H04W 88/08* (2013.01)

(56) References Cited

U.S. PATENT DOCUMENTS

| | | | | |
|---|---|---|---|---|
| 2010/0177747 | A1* | 7/2010 | Chun | H04W 72/0446 |
| | | | | 370/336 |
| 2012/0307767 | A1* | 12/2012 | Yamada | H04W 74/02 |
| | | | | 370/329 |
| 2013/0034069 | A1* | 2/2013 | Uemura | H04W 74/0833 |
| | | | | 370/329 |
| 2013/0194953 | A1* | 8/2013 | Xu | H04W 52/146 |
| | | | | 370/252 |
| 2014/0016593 | A1* | 1/2014 | Park | H04W 74/004 |
| | | | | 370/329 |
| 2014/0050213 | A1* | 2/2014 | Nguyen | H04W 56/0015 |
| | | | | 370/350 |
| 2014/0080490 | A1 | 3/2014 | Bergstrom et al. | |
| 2014/0348078 | A1* | 11/2014 | Kim | H04W 72/0473 |
| | | | | 370/329 |
| 2015/0208445 | A1 | 7/2015 | Chun et al. | |
| 2016/0029405 | A1 | 1/2016 | Zeng et al. | |
| 2017/0078058 | A1* | 3/2017 | Marinier | H04L 5/0044 |
| 2017/0231006 | A1* | 8/2017 | Yin | H04W 74/0816 |
| 2018/0324811 | A1* | 11/2018 | Hu | H04W 72/12 |
| 2020/0015217 | A1* | 1/2020 | Feng | H04B 7/2656 |

OTHER PUBLICATIONS

Written Opinion of the International Searching Authority issued in PCT/JP2017/017228 dated Jun. 13, 2017 (4 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

Extended European Search Report issued in counterpart European Patent Application No. 17792772.0, dated Nov. 27, 2019 (9 pages).

* cited by examiner

| QCI | Resource Type | Priority Level | Packet Delay Budget | Packet Error Loss Rate | Example Services |
|---|---|---|---|---|---|
| 1 | GBR | 2 | 100 ms | $10^{-2}$ | Conversational Voice |
| 2 | GBR | 4 | 150 ms | $10^{-3}$ | Conversational Video (Live Streaming) |
| 3 | GBR | 3 | 50 ms | $10^{-3}$ | Real Time Gaming |
| 4 | GBR | 5 | 300 ms | $10^{-6}$ | Non-Conversational Video (Buffered Streaming) |
| 65 | GBR | 0.7 | 75 ms | $10^{-2}$ | Mission Critical user plane Push To Talk voice (e.g., MCPTT) |
| 66 | GBR | 2 | 100 ms | $10^{-2}$ | Non-Mission-Critical user plane Push To Talk voice |
| 5 | Non-GBR | 1 | 100 ms | $10^{-6}$ | IMS Signalling |
| 6 | Non-GBR | 6 | 300 ms | $10^{-6}$ | Video (Buffered Streaming) TCP-based (e.g., www, e-mail, chat, ftp, p2p file sharing, progressive video, etc.) |
| 7 | Non-GBR | 7 | 100 ms | $10^{-3}$ | Voice, Video (Live Streaming) Interactive Gaming |
| 8 | Non-GBR | 8 | 300 ms | $10^{-6}$ | Video (Buffered Streaming) TCP-based (e.g., www, e-mail, chat, ftp, p2p file sharing, progressive video, etc.) |
| 9 | Non-GBR | 9 | 300 ms | $10^{-6}$ | |
| 69 | Non-GBR | 0.5 | 60 ms | $10^{-6}$ | Mission Critical delay sensitive signalling (e.g., MC-PTT signalling) |
| 70 | Non-GBR | 5.5 | 200 ms | $10^{-6}$ | Mission Critical Data (e.g. example services are the same as QCI 6/8/9) |

FIG. 4

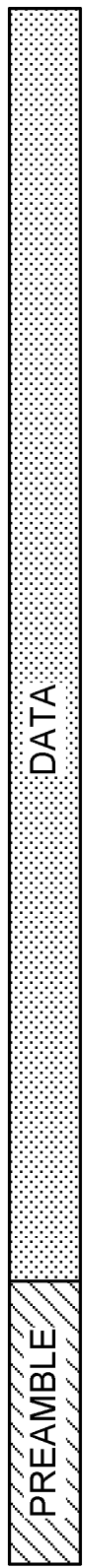
FIG. 7A
FIG. 7B
FIG. 7C

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to 13), when UL synchronization is established between a radio base station and a user terminal, UL data can be transmitted from the user terminal. For this reason, in existing LTE systems, random access procedures (also referred to as "RACH procedures (Random Access CHannel Procedures)," "access procedures," and so on) for establishing UL synchronization are supported.

In random access procedures, a user terminal acquires information related to UL transmission timing (timing advance (TA)) from a response (random access response), which a radio base station returns in response to transmission of a random access preamble (PRACH), and establishes UL synchronization based on this TA.

After UL synchronization is established, the user terminal receives downlink control information (DCI) (UL grant) from the radio base station, and then transmits UL data using the UL resource allocated by the UL grant.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In future radio communication systems (for example, 5G, NR, etc.), it is desirable to accommodate various services such as high-speed and large-capacity communication (eMBB (enhanced Mobile Broad Band)), massive access (mMTC (massive MTC)) from devices (user terminal) for inter-device communication (M2M (Machine-to-Machine)) such as IoT (Internet of Things) and MTC (Machine Type Communication), and low-latency, reliable communication (URLLC (Ultra-Reliable and Low Latency Communication)), in a single framework.

In such future radio communication systems, if random access procedures are performed in the same way as in existing LTE systems before UL data is transmitted, the latency time before UL data starts being transmitted will pose a problem. Also, in future radio communication systems, there is a possibility that the growth of overhead due to UL grants from radio base stations will pose a problem.

Therefore, envisaging future radio communication systems, there is an on-going study to perform communication by allowing contention of UL transmission by multiple user terminals, in order to shorten the latency time before UL data starts being transmitted, and to reduce the increase of overhead. For example, a study is in progress to allow a user terminal to transmit UL data without a UL grant from a radio base station (also referred to as "contention-based UL data transmission," "UL grant-less (-free) UL transmission," "UL grantless and contention-based UL data transmission," etc.).

When introducing contention-based UL data transmission, how to configure the timing to allow contention-based UL data transmission, etc. is a problem. For example, in existing LTE systems, the user terminal controls UL transmission based on the running state of a TA timer started by a TA command included in a random access response (message 2). In this case, how to control contention-based UL data transmission in relationship to the TA timer is the problem.

The present invention has been made in view of the above, and it is therefore an object of the present invention to provide a user terminal and a radio communication method, whereby the period to apply contention-based UL data transmission can be configured adequately.

Solution to Problem

A user terminal according to one aspect of the present invention has a transmission section that transmits UL data to a radio base station, and a control section that controls application of contention-based UL data transmission in which UL data is transmitted without a UL grant from the radio base station, and the control section controls whether or not to apply the contention-based UL data transmission based on a running state of a timing advance (TA) timer.

Advantageous Effects of Invention

According to the present invention, the period to apply contention-based UL data transmission can be appropriately adequately.

BRIEF DESCRIPTION OF DRAWINGS

FIG. 4 is a diagram to show examples of QCIs (QoS Class Identifiers);

FIGS. 7A to 7C are diagrams to show examples of contention-based UL data transmission methods according to the present embodiment;

DESCRIPTION OF EMBODIMENTS

Existing LTE systems (for example, LTE Rel. 8 to 13) support random access procedures for establishing UL synchronization. Random access procedures include contention-based random access (also referred to as "CBRA" and so on) and non-contention-based random access (also referred to as "non-CBRA," "contention-free random access (CFRA)," and so on).

In contention-based random access (CBRA), a user terminal transmits a preamble, which is selected randomly from a plurality of preambles provided for each cell (also referred to as "random access preambles," "random access channels (PRACHs)," "RACH preambles" and so on). Contention-based random access is user terminal-initiated random access procedures, and can be used, for example, when gaining initial access, when starting or resuming UL transmission, and so on.

On the other hand, in non-contention-based random access (non-CBRA, CFRA, etc.), a radio base station assigns preambles in a user terminal-specific manner, by using a downlink (DL) control channel (PDCCH (Physical Downlink Control Channel), EPDCCH (Enhanced PDCCH), etc.), and the user terminals transmit the preambles assigned by the radio base station. Non-contention-based random access is network-initiated random access procedures, and can be used, for example, when conducting handover, when starting or resuming DL transmission and so on (when transmission of DL retransmission control information is started or restarted in the UL).

Figure 1:
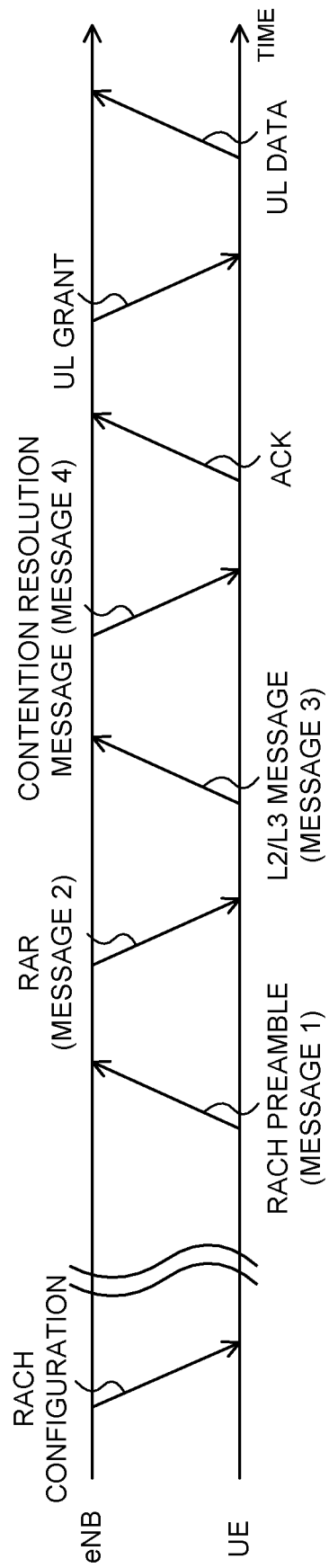
FIG. 1 is a diagram to show an example of contention-based random access procedures.

FIG. 1 is a diagram to show an example of contention-based random access procedures. In FIG. 1, a user terminal receives, in advance, information (PRACH configuration information) that indicates the configuration of a random access channel (PRACH) (PRACH configuration, RACH configuration, etc.), via system information (for example, the MIB (Mater Information Block) and/or SIBs (System Information Blocks)), higher layer signaling (for example, RRC (Radio Resource Control) signaling) and so on.

The PRACH configuration information can indicate, for example, a plurality of preambles (for example, preamble formats) that are defined on a per cell basis, offsets (PRACH frequency offsets) that indicate the starting positions of the time resources (for example, system frame indices, subframe indices and so on) and frequency resources (for example, six resource blocks (PRB (Physical Resource Block)) that are used in PRACH transmission, and so on.

As shown in FIG. 1, when the user terminal transitions from idle mode (RRC_IDLE) to RRC-connected mode (RRC_CONNECTED) (for example, when gaining initial access), if UL synchronization is not established despite the fact that the user terminal is in RRC-connected mode (for example, when UL transmission is started or resumed), the user terminal can randomly select one of a plurality of preambles that are indicated in the PRACH configuration information, and transmit the selected preamble using the PRACH (message 1).

Upon detecting the preamble, the radio base station transmits a random access response (RAR) (message 2) in response to that. After transmitting the preamble, the user terminal attempts to receive an RAR for a predetermined period (RAR window). If the user terminal fails to receive an RAR, the user terminal increases the transmission power of the PRACH and transmits (retransmits) the preamble again. Note that the act of increasing the transmission power upon retransmission is also referred to as "power ramping."

Upon receiving the RAR, the user terminal adjusts the transmission timing in the UL based on the timing advance (TA) that is included in the RAR, and establishes UL synchronization. Furthermore, the user terminal transmits a higher layer (L2/L3 (layer 2/layer 3)) control message (message 3) in the UL resource specified by the UL grant included in the RAR. This control message contains the user terminal's identifier (UE-ID). The user terminal's identifier may be, for example, a C-RNTI (Cell-Radio Network Temporary Identifier) in the even the user terminal is in RRC-connected mode, or may be a higher layer UE-ID such as an S-TMSI (System Architecture Evolution-Temporary Mobile Subscriber Identity) in the event the user terminal is in idle mode.

In response to the higher layer control message, the radio base station sends a contention-resolution message (message 4). The contention-resolution message is transmitted based on the above-mentioned user terminal identifier included in the control message. Upon successfully detecting the contention-resolution message, the user terminal transmits an HARQ (Hybrid Automatic Repeat reQuest)-based positive acknowledgment (ACK) to the radio base station. By this means, the user terminal in idle mode transitions to RRC-connected mode.

On the other hand, if the user terminal fails to detect the contention-resolution message, the user terminal judges that contention has occurred, reselects a preamble, and repeats the random access procedures from message 1 to message 4.

When learning from an ACK from the user terminal that the contention has been resolved, the radio base station transmits a UL grant to the user terminal. The user terminal starts transmitting UL data using the UL resource allocated by the UL grant.

According to the above-described contention-based random access, if the user terminal desires to transmit UL data, the user terminal can voluntarily (autonomously) start random access procedures. Also, since UL synchronization is established first and then UL data is transmitted using a UL resource that is allocated by a UL grant in a user terminal-specific manner, reliable UL transmission is made possible.

Now, future radio communication systems (for example, 5G, NR etc.) are anticipated to accommodate various services such as high-speed and large-capacity communication (eMBB), massive access (mMTC) from devices (user terminals) for inter-device communication (M2M) such as IoT and MTC, and low-latency, reliable communication (URLLC), in a single framework.

In such future radio communication systems, if the same contention-based random access as in existing LTE systems is executed before UL data is transmitted, there is a possibility that the latency time before UL data starts being transmitted will pose a problem. Also, in future radio communication systems, if, before UL data is transmitted, a request for UL resource allocation (scheduling request (SR)) from a user terminal is required, or this UL resource needs to be allocated from a radio base station (UL grant), the growth of overhead is likely to pose a problem.

For example, in the event of massive access such as mMTC, collisions of preambles may occur more frequently among user terminals, and the latency time before UL data starts being transmitted may increase. This is because, in above-described contention-based random access, when a collision of preambles occurs among a plurality of user terminals, at least one of these multiple user terminals must perform random access procedures again.

Also, in massive access such as mMTC, when a large amount of UL grants are transmitted from a radio base station to each user terminal, the ratio of overhead to UL data increases relatively. Consequently, in mMTC, the capacity of DL control channels may be tightened, the spectral efficiency may drop, and so on.

Figure 2:
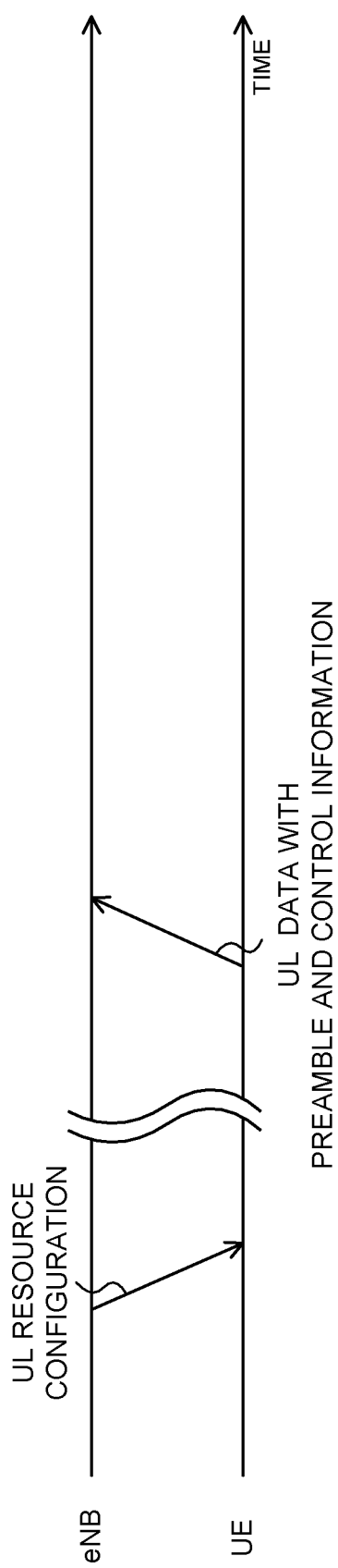
FIG. 2 is a diagram to show an example of contention-based UL data transmission according to the present embodiment.

Therefore, envisaging future radio communication systems, contention-based UL data transmission, in which contention of UL transmission by a plurality of user terminals is permitted and UL data is transmitted without UL grants from radio base stations, is under study for the purpose of shortening the latency time before UL data starts being transmitted and reducing the growth of overhead. FIG. 2 shows an example of contention-based UL data transmission.

As shown in FIG. 2, a user terminal may receive configuration information related to contention-based UL data transmission (CBUL), in advance, via system information (for example, the MIB and/or SIBs), higher layer signaling (for example, RRC signaling) and so on.

Here, the configuration information related to contention-based UL data transmission (CBUL) (hereinafter also referred to as "CBUL configuration information," "UL resource configuration information," etc.) may indicate at least one of a plurality of preambles from which the user terminal can make selections, and UL resources (time and/or frequency resources) for contention-based UL data transmission. These UL resources may be indicated by using at least one of, for example, SFNs, subframe numbers, the number of PRBs, and frequency offsets.

As shown in FIG. 2, the user terminal starts transmitting UL data without receiving a UL grant from a radio base station. To be more specific, when the user terminal transmits UL data upon an event of new UL transmission, the user terminal may transmit a preamble, which is randomly selected, and control information pertaining to the UL data, together. Furthermore, the user terminal may transmit the above control information and UL data without a response from the radio base station to the preamble.

As shown in FIG. 2, in contention-based UL data transmission, contention of UL data from a plurality of user terminals is permitted, so that it is possible to skip messages 2 to 4 (see FIG. 1) in contention-based random access, described above, so that it is possible to shorten the latency time before UL data starts being transmitted. Also, since UL data is transmitted without UL grants from the radio base station, overhead can be reduced.

Note that subsequent UL data may be transmitted together with preambles and control information, or may be transmitted skipping preambles and/or control information.

Meanwhile, when introducing contention-based UL data transmission, how to configure, for example, the timing to allow this contention-based UL data transmission is the problem. For example, in existing LTE systems, the user terminal controls UL transmission based on the running state of a TA timer that is started by a TA command included in a random access response (message 2). The TA timer may be referred to as a "TAT," a "timing advance timer," or a "time alignment timer."

In existing LTE systems (Rel. 12 or earlier versions), a TA timer for use for synchronous (sync) and asynchronous (unsync) control in the uplink is configured for cells (CCs). The TA timer is a timer for measuring the time MAC control elements, which contain TA commands, are not received, and, in other words, is a timer for measuring the time from receipt of a TA command-containing MAC control element. TA commands are commands to indicate uplink channel transmission timing values and are included in MAC control elements. TA commands are transmitted from the radio base station to the user terminal in message 2 in random access procedures.

While the TA timer is running, roughly two types of UL transmission are specified. The first is UL transmission that is scheduled dynamically per TTI, and the second is UL transmission that is assigned semi-statically according to higher layer signaling.

When the TA timer expires (when the time measured by the TA timer continues for a predetermined period of time or longer), the uplink resources reserved for the user terminal are released, and uplink channel transmission is stopped. Incidentally, the TA timer is started (initialized) every time a TA command is received. In cells where the TA timer has not expired, the user terminal can perform UL transmission (transmission of the PUCCH, the PUSCH, the uplink measurement reference signal (SRS), etc.). On the other hand, in cells where the TA timer has expired, the user terminal is limited from making UL transmission other than transmitting the random access preamble (PRACH).

That is, the user terminal controls UL transmission in each cell based on the TA timer configured therein, and does not make transmission other than PRACH transmission in cells where the TA timer has expired. In this case, when the user terminal transmits PRACH and receives message 2, the TA timer is started again, and UL transmission other than PRACH is performed.

In this way, in existing LTE systems, UL transmission is controlled based on the TA timer. So, assuming the case where the above-described contention-based UL data transmission is introduced, the present inventors have come up with the idea of controlling the timing of contention-based UL data transmission based on the relationship with a TA timer (for example, the running state of a TA timer).

To be more specific, the present inventors have come up with the idea of controlling whether or not to apply contention-based UL data transmission based on the running state of a TA timer (or regardless of a TA timer). That is, according to one aspect of the present invention, when control is exerted so that contention-based UL data transmission, in which UL data is transmitted to a radio base station, and in which UL data is transmitted without UL grants from the radio base station, is employed, whether or not to apply this contention-based UL data transmission is controlled based on the running state of a timing advance (TA) timer.

Now, an embodiment of the present invention will be described in detail below with reference to the accompanying drawings. Note that the present embodiment is by no means limited to mMTC and URLLC, and can be applied to various services (for example, background communication, small packet communication, etc.). Also, the states a user terminal may be in according to the present embodiment include an idle state, an RRC-connected state and a state that is newly defined for contention-based UL data transmission.

(First Aspect)

In accordance with a first aspect of the present invention, a case will be described where a user terminal performs contention-based UL data transmission using predetermined UL resources when the TA timer is expired.

Figure 3A:
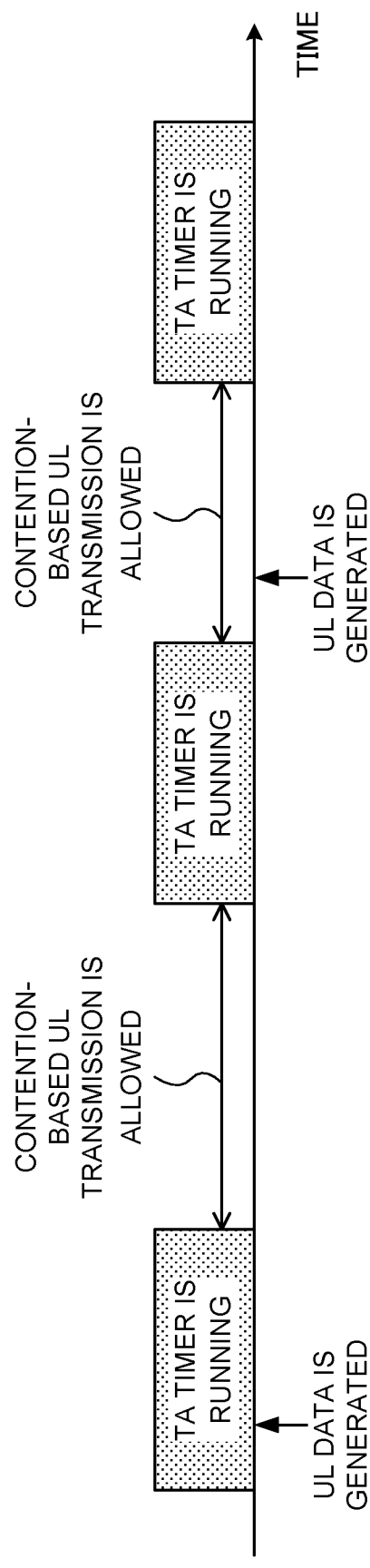
FIGS. 3A and 3B are diagrams to show examples of contention-based UL data transmission timings according to the present embodiment.
Figure 3B:
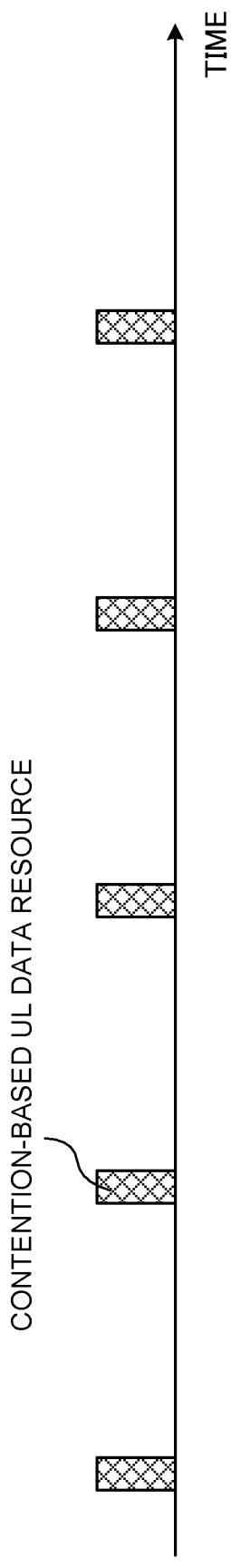

FIGS. 3A and 3B are diagrams to show examples of contention-based UL data transmission timings according to the present embodiment, and are diagrams for explaining the first aspect. According to the first aspect, as shown in FIG. 3A, contention-based UL data transmission cannot be performed while the TA timer is running, and transmission of contention-based UL data is allowed after the TA timer expires. In the first aspect, when UL data is generated while the TA timer is running, non-contention-based (for example, UL grant-based) UL data transmission can be performed, and, if UL data is generated after the TA timer expires, contention-based UL data transmission can be performed.

Here, as a premise of transmitting contention-based UL data, the user terminal may identify information such as information related to radio resources, including their waveforms, in which contention-based UL data transmission can be performed, transmission power parameters, transmission timing offset parameters and so on, by broadcast information or higher layer signaling such as RRC signaling. That is, these pieces of information are reported from the radio base station to the user terminal (see FIG. 3B).

Radio resources include time resources, frequency resources, space (antenna port number) resources, transmission cycles, and the like. Furthermore, information related to waveforms include OFDM waveform generating parameters such as subcarrier spacing, mapping positions of reference signals, reference signal sequences, and the like. Examples of transmission power parameters include $P_0$ (cell/user-specific parameter), α (path loss compensation factor) and so on. Examples of transmission timing offset parameters includes parameters such as how much timing offset is given to DL receiving timing.

When contention-based UL data is transmitted in accordance with the first aspect, if UL data is generated while the TA timer is expired, the user terminal can follow RACH procedures and start the TA timer, and then choose whether to control UL data transmission (non-contention-based UL data transmission) based on UL grants, or to perform contention-based UL data transmission. This choice can be made based on the data service type, the QoS (Quality of Service) parameter (QCI (QoS Class Identifier)), which is configured per bearer, and so on. As shown in FIG. 4, a QCI is associated with, for example, a resource type, a priority level, a packet delay budget, a packet error loss rate, a service example, and so on.

Alternately, which transmission method the user terminal is to employ may be indicated from the radio base station to the user terminal, by higher layer signaling (for example, RRC signaling, broadcast information, etc.).

The user terminal does not perform contention-based UL data transmission when UL data is generated while the TA timer is running. In this case, the system is scheduled using UL grants, and non-contention-based UL data transmission is controlled. In control of non-contention-based UL data transmission, the user terminal transmits a scheduling request (SR) to the radio base station, and the radio base station allocates resources.

According to the first aspect, when contention-based UL data transmission is performed, transmission timings in contention-based UL data transmission can be configured so that TA is not applied, as in PRACH transmission.

According to the first aspect, while the TA timer is running, the radio base station controls UL transmission precisely, including control of the MCS (modulation and coding scheme) and others, and performs contention-based UL data transmission even when the TA timer is expired, delays in UL data transmission can be prevented. For example, according to the first aspect, contention-based UL data transmission can be performed for UL data that needs to be transmitted in a hurry, and UL grant-based UL data transmission (non-contention-based UL data transmission) can be performed for UL data other than UL data that needs to be transmitted in a hurry.

(Second Aspect)

In accordance with a second aspect of the present invention, a case will be described where the user terminal transmits contention-based UL data using predetermined UL resources while the TA timer is running.

Figure 5:
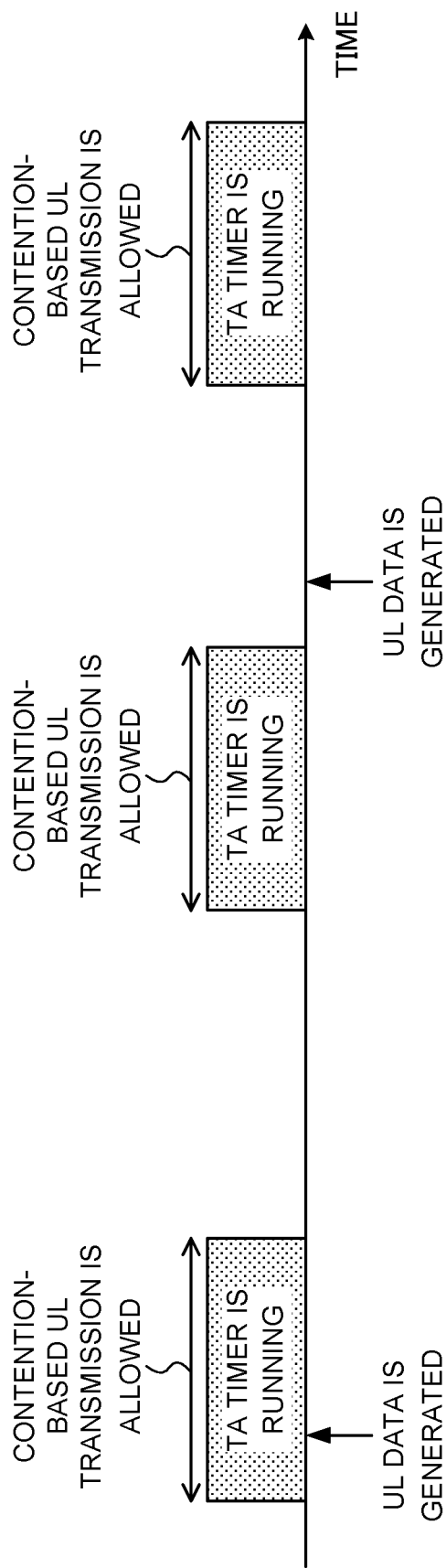
FIG. 5 is a diagram to show other examples of contention-based UL data transmission timings according to the present embodiment.

FIG. 5 is a diagram to show an example of the timing of contention-based UL data transmission according to the present embodiment, and is a diagram to explain the second aspect. According to the second aspect, as shown in FIG. 5, while the TA timer is running, transmission of contention-based UL data is allowed, and after the TA timer expires, contention-based UL data cannot be transmitted. According to the second aspect, when UL data is generated after the TA timer expires, the TA timer is started, and contention-based UL data transmission (or non-contention-based UL data transmission) is performed.

The premise of transmitting contention-based UL data can be the same as in the first aspect. According to the second aspect, if UL data is generated while the TA timer is expired, the user terminal performs RACH procedures and starts the TA timer. While the TA timer is running, the user terminal chooses whether to perform non-contention-based UL data transmission by performing SR transmission, or to perform contention-based UL data transmission. This choice can be made based on the data service type, the QoS (Quality of Service) parameter (QCI (QoS Class Identifier)), which is configured per bearer, and so on.

Alternately, which transmission method the user terminal is to employ may be indicated from the radio base station to the user terminal, by higher layer signaling (for example, RRC signaling, broadcast information, etc.).

According to the second aspect, when contention-based UL data transmission is performed, transmission timings in contention-based UL data transmission can be configured by applying TAs, which are based on TA commands.

According to the second aspect, since UL transmission during the expiration of the TA timer can be limited to the PRACH, congestion of contention-based UL data transmission in the system can be controlled on the radio base station side. For example, the radio base station can reduce the congestion of contention-based UL data transmission in the system by shortening the activation time of the TA timer.

(Third Aspect)

Although cases have been described above with the first aspect and the second aspect where contention-based UL data transmission is performed in consideration of the relationship with the TA timer, cases may also occur where contention-based UL data is transmitted irrespective of the TA timer. In accordance with a third aspect of the present invention, a case where the user terminal transmits contention-based UL data using predetermined UL resources regardless of the TA timer will be described. This third aspect is also included in one aspect of the present invention.

Figure 6:
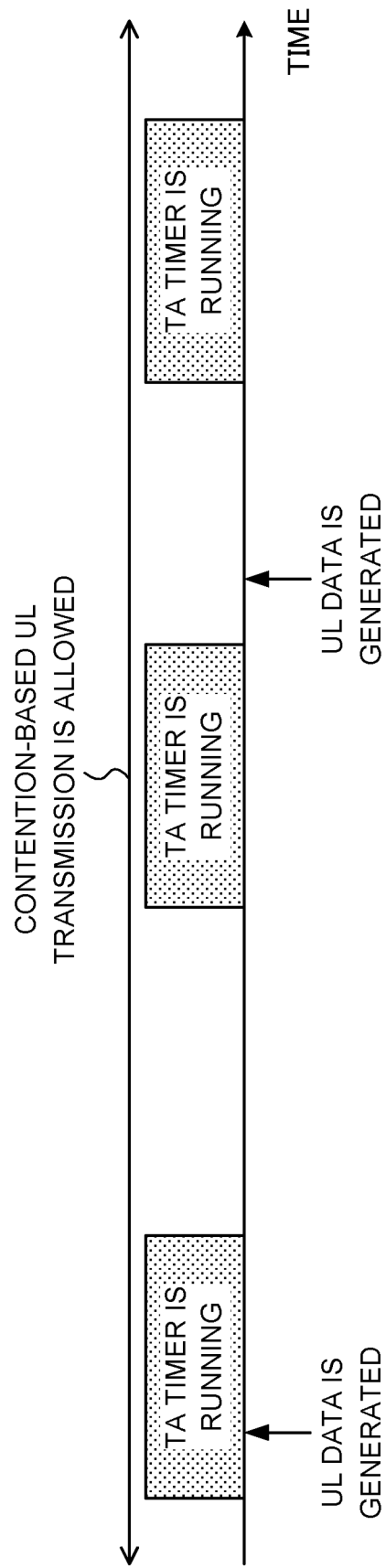
FIG. 6 is a diagram to show other examples of contention-based UL data transmission timings according to the present embodiment.

FIG. 6 is a diagram to show examples of contention-based UL data transmission timings according to the present embodiment, and is a diagram to explain the third aspect. According to the third aspect, as shown in FIG. 6, even while the TA timer is running or after the TA timer expires, transmission of contention-based UL data is allowed. According to the third aspect, contention-based UL data can be transmitted regardless of whether the TA timer is running.

The premise of transmitting contention-based UL data can be the same as in the first aspect. According to the third aspect, if UL data is generated while the TA timer is running, the user terminal can choose whether to perform non-contention-based UL data transmission by performing SR transmission, or to perform contention-based UL data transmission. Also, if UL data is generated after the TA timer expires, the user terminal can choose whether to perform non-contention-based UL data transmission by performing RACH procedures and starting the TA timer, or to perform contention-based UL data transmission. This choice can be made based on the data service type, the QoS (Quality of Service) parameter (QCI (QoS Class Identifier)), which is configured per bearer, and so on.

Alternately, which transmission method the user terminal is to employ may be indicated from the radio base station to the user terminal, by higher layer signaling (for example, RRC signaling, broadcast information, etc.).

According to the third aspect, when contention-based UL data transmission is performed after the TA timer is expired, transmission timings in contention-based UL data transmission can be configured so that TA is not applied, as in PRACH transmission. On the other hand, when contention-based UL data transmission is performed while the TA timer is running, transmission timings in contention-based UL data transmission can be determined by applying TAs, which are based on TA commands.

According to the third aspect, contention-based UL data transmission can be performed even while the TA timer is running, so that the overhead required for UL grants can be reduced. Also, even when UL data is generated after the TA timer expires, delay with UL data can be suppressed by applying contention-based UL data transmission.

(Fourth Aspect)

In accordance with a fourth aspect of the present invention, the transmission method in contention-based UL data transmission (for example, configurations of UL data) will be described. According to the fourth aspect, when contention-based UL data transmission is performed, UL data and a preamble used for user identification report and/or channel estimation are multiplexed and transmitted.

FIG. 7 is a diagram to show an example of a contention-based UL data transmission method according to the present embodiment. To provide UL data in contention-based UL data transmission, for example, a preamble and a data signal (for example, UL data) may be multiplexed, as shown in FIGS. 7A and 7B. Here, the preamble can be used for at least one of detection of whether or not there is contention-based UL data, reporting of user terminal identification information, timing synchronization, channel estimation for data demodulation, and so on.

When a preamble is configured to be time-multiplexed with a data signal, the base station can detect that contention-based UL transmission is made, at an early stage, and, by making each of the preamble and the data signal a single-carrier waveform (or DFT-precoded OFDM), the peak-to-average power ratio (PAPR) of the transmission signal waveform can be suppressed. When a preamble is configured to be frequency-multiplexed or code-multiplexed with a data signal, the preamble length can be extended to the same extent as the data signal length, so that the accuracy of preamble detection can be enhanced.

As shown in FIG. 7B, in addition to the preamble, a separate reference signal may be included for data demodulation. In this way, by adding a reference signal in addition to the preamble, the accuracy of receipt in the radio base station can be improved. Furthermore, as shown in FIG. 7C, a configuration may be adopted here in which a reference signal is added without providing a preamble. According to such a data structure, the overhead of UL data can be reduced.

Figure 8A:
FIGS. 8A and 8B are diagrams to show other examples of contention-based UL data transmission methods according to the present embodiment.
Figure 8B:

FIG. 8 is a diagram to show another example of the contention-based UL transmission method according to the present embodiment. As shown in FIGS. 8A and 8B, UL data upon contention-based UL data transmission may multiplex L1/L2 control information for UL and UL data, for example. At least one of time multiplexing, frequency multiplexing, code multiplexing and a combination of these can be applied to both of them. For example, the user terminal may transmit L1/L2 control information of contention-based UL data in a L1/L2 control channel.

L1/L2 control information of contention-based UL data may include at least one of identification information of the user terminal that transmits the UL data, information related to the UL data (for example, the MCS, the number of MIMO layers, precoding information, the transport block size, etc.), information about the capability of the user terminal, information about the transmission resources of the UL data (for example, frequency resource index, etc.), information about retransmission control of the UL data, (for example, the HARQ process number, information indicating whether new data is present (NDI (New data indicator)), information specifying redundancy (RV (Redundancy version)), etc.), and information about repetition of the UL data.

L1/L2 control information for UL can perform the same control as L1/L2 control information for DL. For example, the user terminal may determine the resource index of the L1/L2 control information and the number of its coding rate or repetitions (aggregation level) based on received quality and so on. In a resource that may contain L1/L2 control information for UL, the radio base station performs blind decoding on the assumption of a coding rate or the number of repetitions (aggregation level) at which the L1/L2 control information may be transmitted, the radio base station can judge L1/L2 control information for which the CRC check result is OK as received L1/L2 control information. As a result, a user terminal with poor quality can transmit by lowering the coding rate of L1/L2 control information, and a user terminal with good quality can transmit by lowering the overhead by increasing the coding rate of L1/L2 control information, so that users in various environments can transmit contention-based UL data.

Furthermore, by using such a data structure, the downlink control information (DCI) transmitting/receiving control in the downlink can also be performed in the uplink. In this case, in the radio base station, for the L1/L2 control information channel for UL, blind decoding is performed on L1/L2 control information candidates that may have been received, and, based on the L1/L2 control information correctly decoded, UL data (UL data channel) is received.

When L1/L2 control information for UL can be decoded, ACK/NACK as a result of decoding corresponding data may be separately reported in the downlink control channel. In this way, the user terminal can judge whether the radio base station could not receive the L1/L2 control information, or whether the radio base station could receive L1/L2 control information but failed to demodulate data, and optimize the adaptive control in subsequent contention-based UL data transmission.

Furthermore, in a data structure in which L1/L2 control information and UL data are multiplexed, reference signals may be configured. For example, as shown in FIG. 8A, a reference signal for L1/L2 control information and data demodulation may be configured as L1/L2 control information, as shown in FIG. 8B, a reference signal for L1/L2 control information demodulation may be configured as L1/L2 control information and a reference signal for data demodulation may be configured as a data signal. Note that the reference signal may be common for L1/L2 control information and data demodulation, or may be individual.

The data structure shown in FIG. 7 and FIG. 8 is not limited to this, and can be appropriately changed according to the use environment. Furthermore, the preamble shown in FIG. 7 and the L1/L2 control information shown in FIG. 8 may be configured directly or with the reference signal in the data signal.

Note that, in above embodiments 1 to 4, important UL data such as signaling radio bearer and C-plane information may be transmitted in non-contention-based UL data transmission by starting the TA timer based on PRACH, regardless of whether or not to configure the contention-based UL resource and regardless of the status of the TA timer.

(Radio Communication System)

Now, the structure of a radio communication system according to the present embodiment will be described below. In this radio communication system, each radio communication method according to the above-described embodiments is employed. Note that the radio communication method according to each embodiment may be used alone or may be used in combination.

Figure 9:
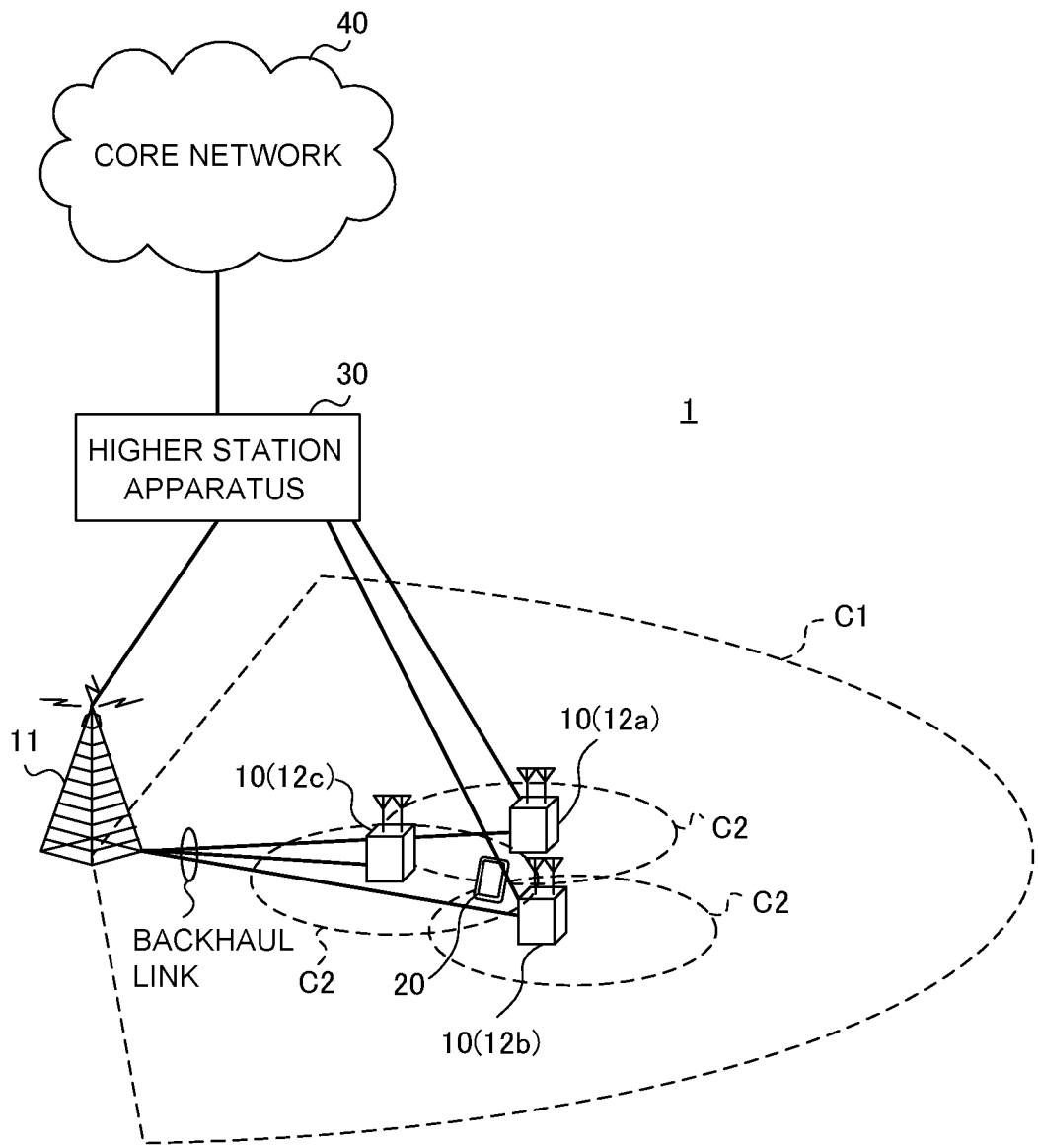
FIG. 9 is a diagram to show a schematic structure of a radio communication system according to the present embodiment.

FIG. 9 is a diagram to show a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A" (LTE-Advanced), "IMT-Advanced," "4G," "5G," "FRA" (Future Radio Access), "NR" (New Rat) and so on.

The radio communication system 1 shown in FIG. 9 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. A configuration in which different numerologies are applied between cells may be adopted. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells. Note that it is possible to adopt a configuration including a TDD carrier, in which shortened TTIs are applied to some of a plurality of cells.

Between the user terminals 20 and the radio base station 11, communication is carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

In the radio communication system 1, a DL data channel (PDSCH (Physical Downlink Shared CHannel), which is also referred to as "DL shared channel" and so on), which is used by each user terminal 20 on a shared basis, a broadcast channel (PBCH (Physical Broadcast CHannel)), L1/L2 control channels and so on are used as DL channels. User data, higher layer control information and SIBs (System Information Blocks) are communicated in the PDSCH. Also, the MIB (Master Information Block) is communicated in the PBCH.

The L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement information (ACK/NACK) in response to the PUSCH is communicated by the PHICH. The EPDCCH is frequency-division-multiplexed with the PDSCH (downlink shared data channel) and used to communicate DCI and so on, like the PDCCH.

In the radio communication system 1, a UL data channel (PUSCH (Physical Uplink Shared CHannel), which is also referred to as "UL shared channel" and so on), which is used by each user terminal 20 on a shared basis, a UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of delivery acknowledgment information (ACK/NACK) and radio quality information (CQI), is communicated via the PUSCH or the PUCCH. By means of the PRACH, random access preambles for establishing connections with cells are communicated.

(Radio Base Station)

Figure 10:
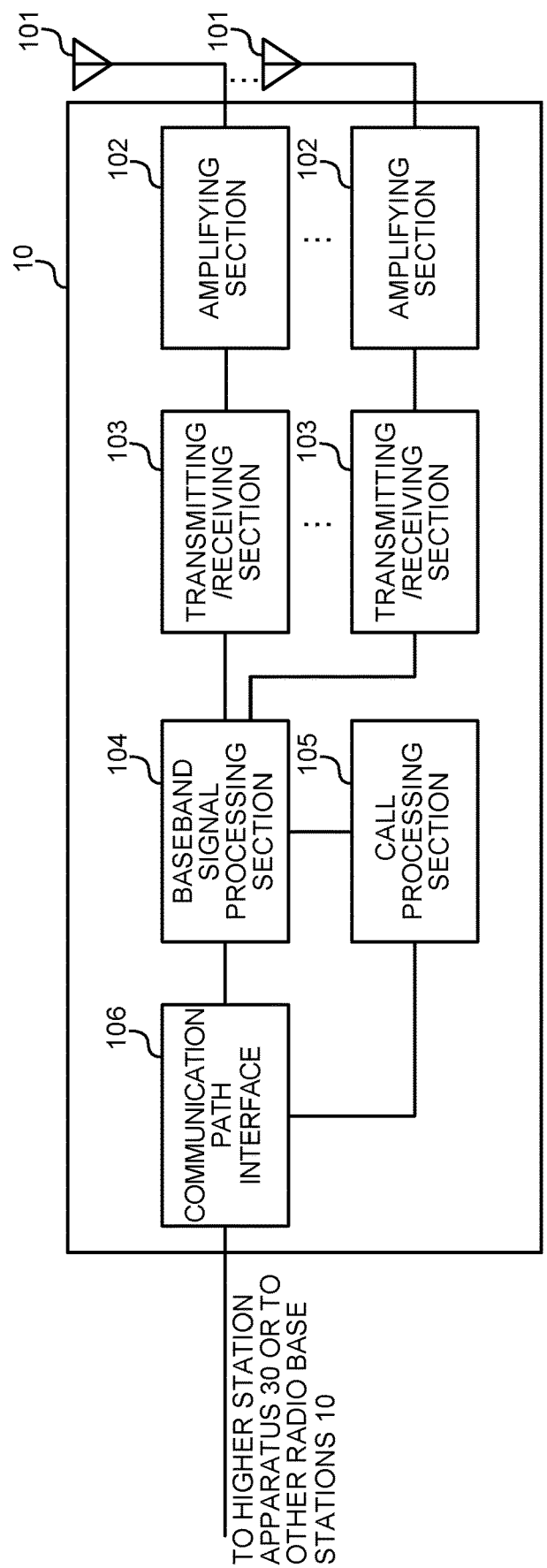
FIG. 10 is a diagram to show an example of an overall structure of a radio base station according to the present embodiment.

FIG. 10 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

DL data to be transmitted from the radio base station 10 to a user terminal 20 is input from the higher station apparatus 30 to the baseband signal processing section 104, via the communication path interface 106.

In the baseband signal processing section 104, the DL data is subjected to transmission processes, including a PDCP (Packet Data Convergence Protocol) layer process, division and coupling of user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signals (for example, a DL control signal (DL control channel), a DL data signal (DL data channel, DL shared channel and so on), a DL reference signal (DM-RS, CSI-RS and so on), a discovery signal, a synchronization signal, a broadcast signal and so on), and receive UL signals (for example, a UL control signal (UL control channel), a UL data signal (UL data channel, UL shared channel and so on), a UL reference signal and so on).

To be more specific, the transmitting/receiving sections 103 transmit configuration information related to contention-based UL data transmission (CBUL configuration information), to the user terminals 20, by using system information or higher layer signaling. In addition, the transmitting/receiving sections 103 receive UL signals (at least one of preambles, control information, and UL data) transmitted from the user terminals 20 in contention-based UL data transmission.

The transmitting section and the receiving section of the present invention are comprised of a transmitting/receiving section 103 and/or a communication path interface 106.

Figure 11:
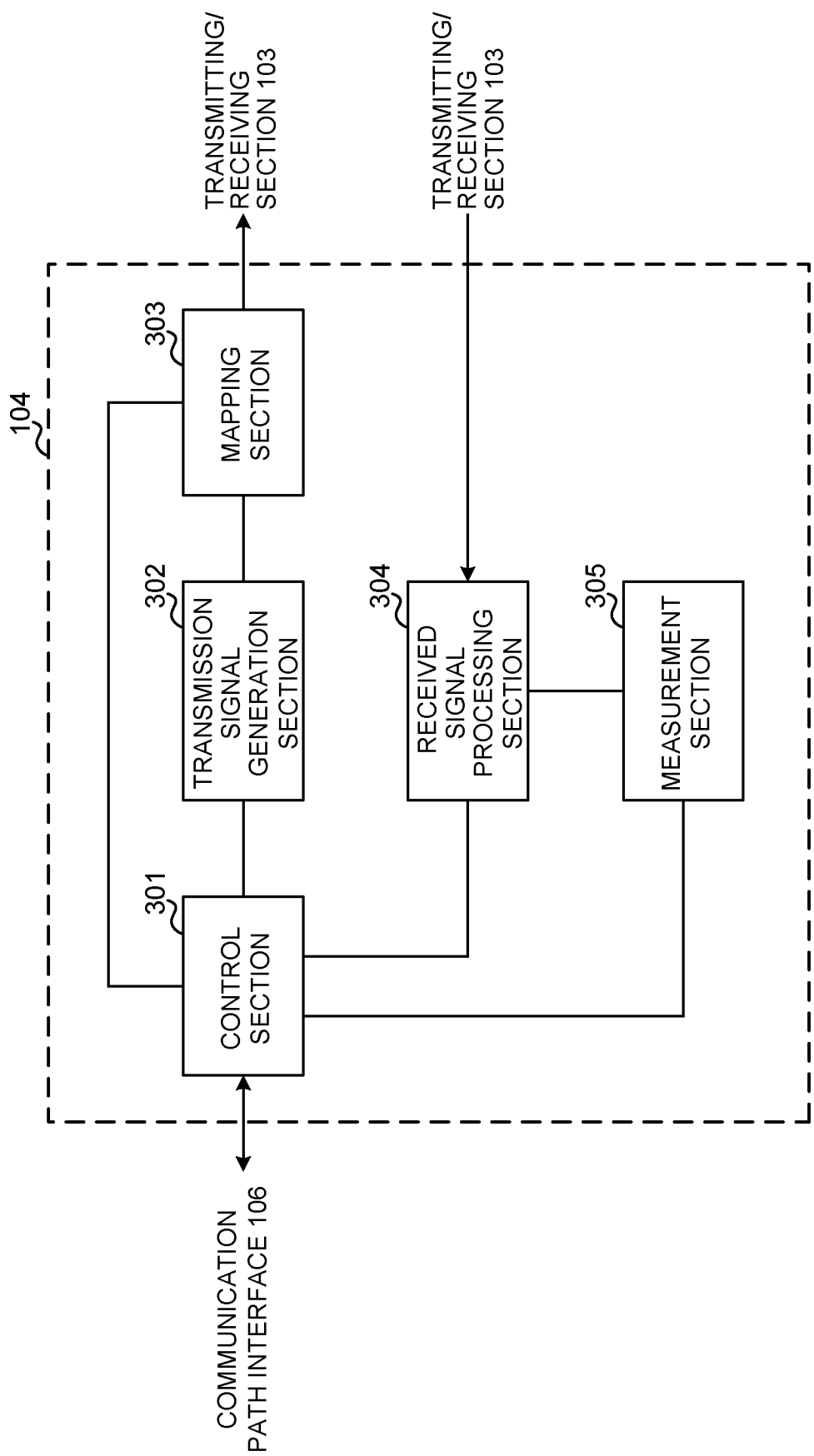
FIG. 11 is a diagram to show an example of a functional structure of a radio base station according to the present embodiment.

FIG. 11 is a diagram to show an example of a functional structure of a radio base station according to the present embodiment. Note that, although FIG. 11 primarily shows functional blocks that pertain to characteristic parts of the present embodiment, the radio base station 10 has other functional blocks that are necessary for radio communication as well. As shown in FIG. 11, the baseband signal processing section 104 at least has a control section 301, a transmission signal generation section 302, a mapping section 303, a received signal processing section 304 and a measurement section 305.

The control section 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of DL signals and/or UL signals. To be more specific, the control section 301 controls the transmission signal generation section 302, the mapping section 303 and the transmitting/receiving sections 103 to generate and transmit DCI (DL assignment) that includes DL data channel scheduling information and DCI (UL grant) that includes UL data channel scheduling information.

Furthermore, the control section 301 may control contention-based UL data transmission (CBUL), in which UL data is transmitted from the user terminals 20 without UL grants. For example, the control section 301 may determine the above-noted CBUL configuration information, including, for example, UL resources that can be used in contention-based UL data transmission, and so on.

Furthermore, the control section 301 may control receipt of UL data according to the transmission format for contention-based UL data transmission. Here, this transmission format may be comprised of a random access channel for transmitting randomly-selected preambles, a control channel for transmitting control information that is used to receive the UL data, and a data channel for transmitting the UL data (FIG. 8). Furthermore, in the control of non-contention-based UL data transmission, the control section 301 may perform resource allocation when SR is transmitted from the user terminal.

For example, the control section 301 may detect UL transmissions based on the above preambles. Furthermore, the control section 301 may blind-decode UL control channels and identify the user terminals 20 based on the detected control information. Furthermore, the control section 301 may control the receiving process (demodulation, decoding, etc.) of UL data from the user terminals 20 in accordance with the above control information. Also, the control section 301 may control beam search and/or channel estimation, which are performed based on the above preambles.

The transmission signal generation section 302 generates DL signals (DL control channel, DL data channel, DL reference signals such as DM-RS, and so on) based on commands from the control section 301 and outputs the DL signals to the mapping section 303. The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals that are transmitted from the user terminals 20 (UL control channel, UL data channel, UL reference signals, and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, the received signal processing section 304 outputs at least one of a preamble, control information and UL data to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

Also, by using the received signals, the received signal processing section 304 may measure the received power (for example, RSRP (Reference Signal Received Power)), the received quality (for example, RSRQ (Reference Signal Received Quality)), channel states and so on. The measurement results may be output to the control section 301.

(User Terminal)

Figure 12:
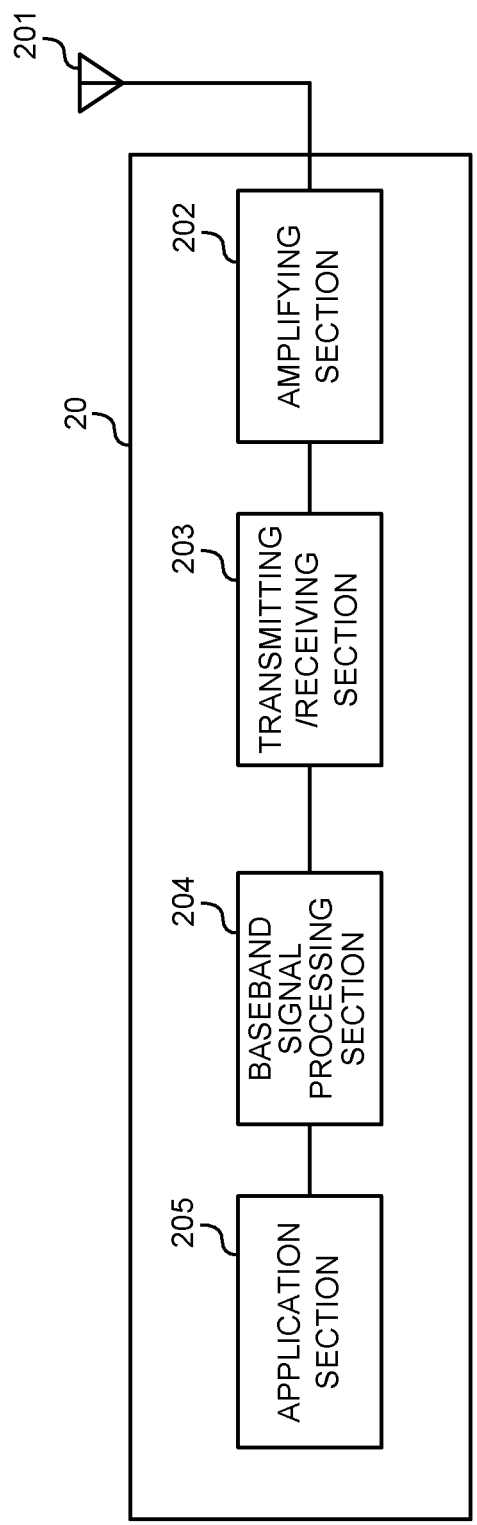
FIG. 12 is a diagram to show an example of an overall structure of a user terminal according to the present embodiment.

FIG. 12 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process and so on. The DL data is forwarded to the application section 205. The application section 205 performs processes related to higher layers above the physical layer and the MAC layer and so on. Also, in the DL data, the system information and the higher layer control information are also forwarded to the application section 205.

Meanwhile, the UL data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 transmit DL signals (for example, a DL control signal (DL control channel), a DL data signal (DL data channel, DL shared channel and so on), a DL reference signal (DM-RS, CSI-RS and so on), a discovery signal, a synchronization signal, a broadcast signal and so on), and receive UL signals (for example, a UL control signal (UL control channel), a UL data signal (UL data channel, UL shared channel and so on), a UL reference signal and so on).

To be more specific, the transmitting/receiving sections 203 receive configuration information related to contention-based UL data transmission (CBUL configuration information) using system information or higher layer signaling. In addition, the transmitting/receiving sections 203 transmit UL signals (at least one of preambles, control information and UL data) based on a transmission format for contention-based UL data transmission.

Figure 13:
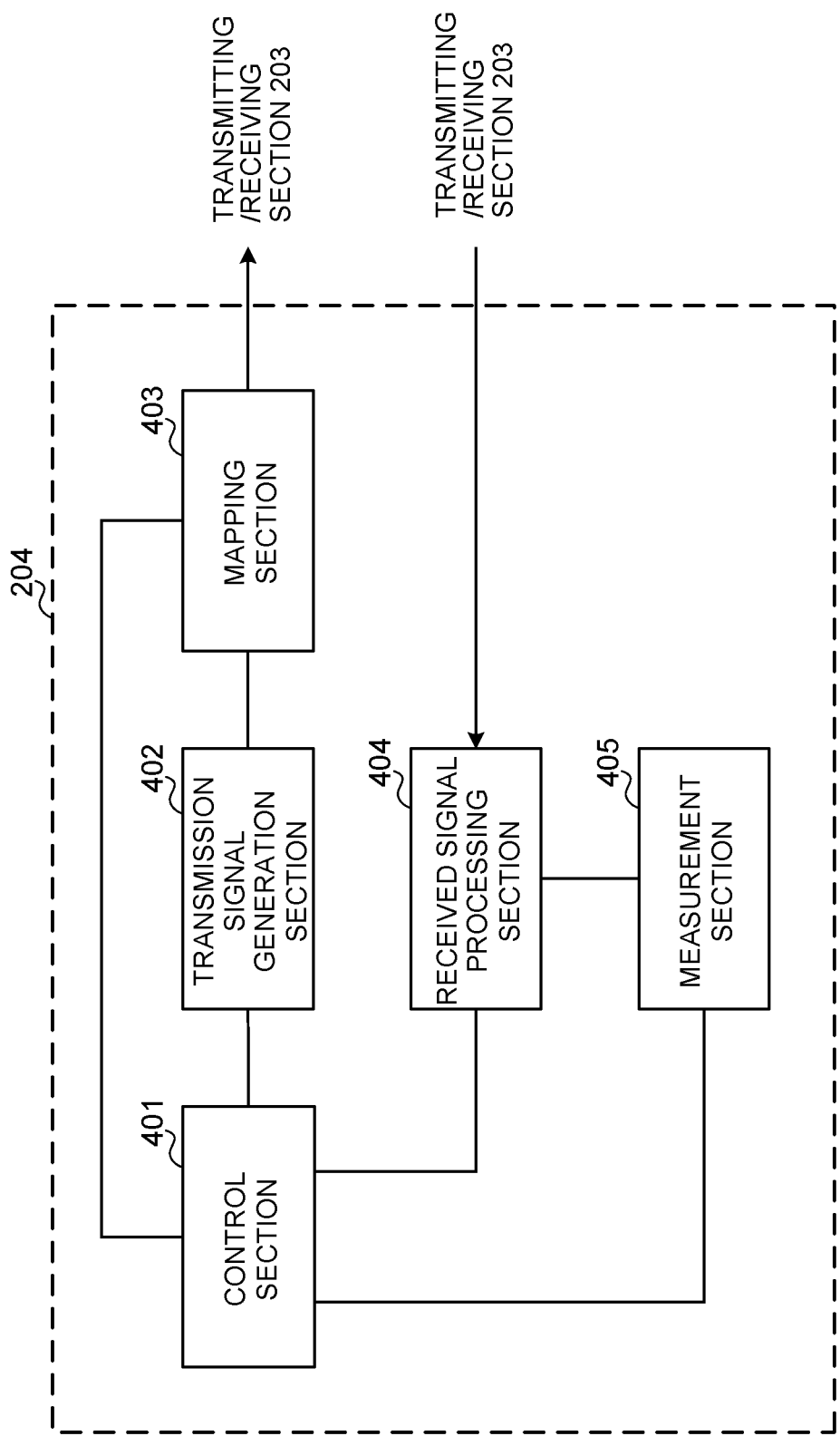
FIG. 13 is a diagram to show an example of a functional structure of a user terminal according to the present embodiment.

FIG. 13 is a diagram to show an example of a functional structure of a user terminal according to the present embodiment. Note that, although FIG. 13 primarily shows functional blocks that pertain to characteristic parts of the present embodiment, the user terminal 20 has other functional blocks that are necessary for radio communication as well. As shown in FIG. 13, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires a DL control channel and a DL data channel transmitted from the radio base station 10 from the received signal processing section 404. To be more specific, the control section 401 controls the transmitting/receiving sections 203 and the received signal processing section 404 to blind-decode the DL control channel to detect DCI, and receive the DL data channel based on the DCI. In addition, the control section 401 estimates channel gain based on DL reference signals and demodulates the DL data channel based on the estimated channel gain.

The control section 401 may control transmission of retransmission control information (for example, HARQ-ACK, etc.) transmitted in a UL control channel or a UL data channel, based on results of deciding whether or not retransmission control is necessary for DL data channels, and so on. Furthermore, the control section 401 may control transmission of channel state information (CSI), which is generated based on DL reference signals.

In addition, the control section 401 controls contention-based UL data transmission (CBUL). To be more specific, the control section 401 controls whether to apply contention-based UL data transmission based on the running state of a timing advance (TA) timer. At this time, the control section 401 may control UL data transmission without UL grants, in accordance with the transmission format for contention-based UL data transmission. This transmission format may be comprised of an access channel for transmitting randomly-selected preambles, a control channel for transmitting control information that is used to receive UL data, and a data channel for transmitting the UL data (FIGS. 3 to 5).

To be more specific, in accordance with the first aspect of the present invention, when UL data is generated after the TA timer expires, the control section 401 chooses whether to perform contention-based UL data transmission, or to start the TA timer by executing RACH procedures, and shift to UL data transmission (non-contention-based UL data transmission) control based on UL grants (see FIG. 3). On the other hand, if UL data is generated while the TA timer is running, contention-based UL data transmission is not performed. In this case, the system is scheduled using UL grants, and non-contention-based UL data transmission is controlled. In the case of non-contention-based UL data transmission, the user terminal transmits SR to the radio base station. When contention-based UL data transmission is performed, transmission timings in contention-based UL data transmission can be configured so that TA is not applied, as in PRACH transmission.

In accordance with the second aspect of the present invention, when UL data is generated after the TA timer expires, the control section 401 executes RACH procedures to start the TA timer. In this case, while the TA timer is running, the control section 401 chooses whether to perform non-contention-based UL data transmission by performing SR transmission, or to perform contention-based UL data transmission (see FIG. 5). When performing contention-based UL data transmission, transmission timings in contention-based UL data transmission can be determined by applying TAs, which are based on TA commands.

In accordance with the third aspect of the present invention, when UL data is generated after the TA timer expires, the control section 401 chooses whether to perform contention-based UL data transmission, or to perform non-contention-based UL data transmission by starting the TA timer by performing RACH procedures (see FIG. 6). Also, if UL data is generated while the TA timer is running, the control section 401 chooses whether to perform non-contention-based UL data transmission by performing SR transmission, or to perform contention-based UL data transmission.

According to the third aspect, in the case of contention-based UL data transmission after the TA timer expires, transmission timings in contention-based UL data transmission are configured so as not to apply TA, like PRACH transmission. Meanwhile, in the case of contention-based UL data transmission while the TA timer is running, transmission timings in contention-based UL data transmission can be determined by applying TAs, which are based on TA commands.

In addition, the control section 401 may determine the UL resource to use for at least one of the random access channel, the UL control channel and the UL data channel, based on the above-described CBUL configuration information. This UL resource may be at least one of a time resource, a frequency resource, a code resource, a power resource, and a space resource.

For example, the control section 401 may randomly select a preamble to be transmitted in the above transmission format from a plurality of preambles indicated in the above CBUL configuration information. In addition, the control section 401 may determine the UL resource for the random access channel based on the above CBUL configuration information. Similarly, the control section 401 may determine the UL resources for the control channel and/or the UL data channel based on the above CBUL configuration information.

The transmission signal generation section 402 generates UL signals (UL control channel, UL data channel, UL reference signals and so on) based on commands from the control section 401, and outputs the UL signals to the mapping section 403. The transmission signal generation section 402 can be constituted by a signal generator, a signal generating circuit or signal generating apparatus that can be described based on general understanding of the technical field to which the present invention pertains.

Also, the transmission signal generation section 402 generates UL data channels based on commands from the control section 401. For example, when a UL grant is included in a DL control channel that is reported from the radio base station 10, the control section 401 commands the transmission signal generation section 402 to generate the UL data channel.

The mapping section 403 maps the UL signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signal include, for example, DL signals transmitted from the radio base station 10 (DL control channel, DL data channel, DL reference signals and so on). The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from control section 401, the received signal processing section 404 performs blind decoding of the DL control channel, which schedules transmission and/or reception of the DL data channel, and performs the receiving process of the DL data channel based on this DCI. In addition, the received signal processing section 404 estimates channel gain based on the DM-RS or the CRS, and demodulates the DL data channel based on the estimated channel gain.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of the data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the DL received quality (for example, RSRQ), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 14:
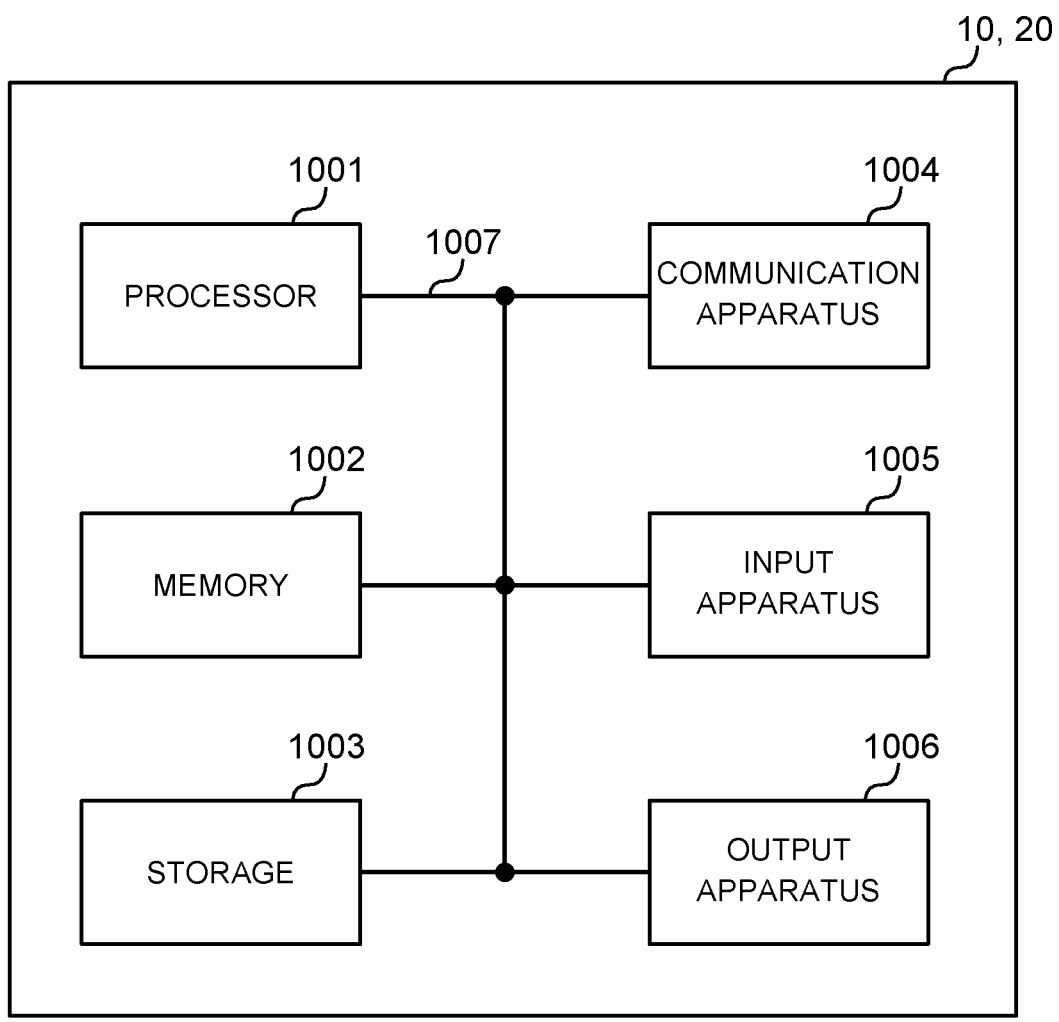
FIG. 14 is a diagram to show an example hardware structure of a radio base station and a user terminal according to the present embodiment.

That is, the radio base stations, user terminals and so according to the embodiments of the present invention may function as a computer that executes the processes of the radio communication method of the present invention. FIG. 14 is a diagram to show an example of a hardware structure of a radio base station and a user terminal according to the present embodiment. Physically, a radio base station 10 and a user terminal 20, which have been described, may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) or the like. The memory 1002 can store executable programs (program codes), software modules, and the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols (OFDM (Orthogonal Frequency Division Multiplexing) symbols, SC-FDMA (Single Carrier Frequency Division Multiple Access) symbols, and so on) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block" (PRB (Physical RB)), a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, symbols and the like described above are merely examples. For example, configurations pertaining to the number of subframes included in a radio frame, the number of slots included in a subframe, the number of symbols and RBs included in a slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Information, signals and so on can be output from higher layers to lower layers and/or from lower layers to higher layers. Information, signals and so on may be input and output via a plurality of network nodes.

The information, signals and so on that are input and/or output may be stored in a specific place (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and signals and/or combinations of these.

Physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network consisting of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX (registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-093481, filed on May 6, 2016, including the specification, drawings and abstract, is incorporated herein by reference in its entirety.

The invention claimed is:

1. A terminal comprising:
a transmitter that transmits at least one of a first physical uplink shared channel (PUSCH) that is scheduled dynamically and a second PUSCH that is configured semi-statically according to higher layer signaling; and
a processor that, when a time alignment timer associated with a cell is not running, controls not to transmit the first PUSCH and the second PUSCH in the cell,
wherein when the time alignment timer is not running, the processor controls to transmit a random access preamble, and the processor starts or restarts the time alignment timer based on a timing advance command included in a random access response that is transmitted in response to the random access preamble, and
wherein the processor controls to transmit the second PUSCH in accordance with a path loss factor that is notified by higher layer signaling while the time alignment timer starts or restarts.

2. The terminal according to claim 1, wherein the processor restricts uplink transmission to a random access preamble when the time alignment timer is not running.

3. A radio communication method comprising:
controlling transmission of at least one of a first physical uplink shared channel (PUSCH) that is scheduled dynamically and a second PUSCH that is configured semi-statically according to higher layer signaling; and
when a time alignment timer associated with a cell is not running, controlling not to transmit the first PUSCH and the second PUSCH in the cell,
when the time alignment timer is not running, controlling transmission of a random access preamble, and starting or restarting the time alignment timer based on a timing advance command included in a random access response that is transmitted in response to the random access preamble, and
controlling transmission of the second PUSCH in accordance with a path loss factor that is notified by higher layer signaling while the time alignment timer starts or restarts.

4. A base station comprising:
a receiver that receives at least one of a first physical uplink shared channel (PUSCH) that is scheduled dynamically and a second PUSCH that is configured semi-statically according to higher layer signaling; and
a processor that, when a time alignment timer associated with a cell is not running, controls not to receive the first PUSCH and the second PUSCH in the cell,
wherein when the time alignment timer is not running, the processor controls to receive a random access preamble from a terminal, and the time alignment timer is started or restarted by the terminal based on a timing advance command included in a random access response that is transmitted by the base station in response to the random access preamble, and
wherein the processor controls to receive the second PUSCH in accordance with a path loss factor that is notified by higher layer signaling while the time alignment timer starts or restarts.

5. A system comprising a terminal and a base station, wherein:
the terminal comprises:
a transmitter that transmits at least one of a first physical uplink shared channel (PUSCH) that is scheduled dynamically and a second PUSCH that is configured semi-statically according to higher layer signaling; and
a processor that, when a time alignment timer associated with a cell is not running, controls not to transmit the first PUSCH and the second PUSCH in the cell,
wherein when the time alignment timer is not running, the processor controls to transmit a random access preamble, and the processor starts or restarts the time alignment timer based on a timing advance command included in a random access response that is transmitted in response to the random access preamble, and
wherein the processor controls to receive the second PUSCH in accordance with a path loss factor that is notified by higher layer signaling while the time alignment timer starts or restarts; and
the base station comprises:
a receiver that receives the first PUSCH and the second PUSCH.

* * * * *